United States Patent [19]

Klapproth, deceased et al.

[11] 4,178,402

[45] Dec. 11, 1979

[54] CYLINDER BLANKET FOR OFFSET PRINTING PRESSES

[76] Inventors: Friedrich Klapproth, deceased, late of Alsdorf, Fed. Rep. of Germany; by Maria Elisabeth Klapproth, executrix, Überheide 3, West, D 511 Alsdorf, Fed. Rep. of Germany

[21] Appl. No.: 874,539

[22] Filed: Feb. 2, 1978

Related U.S. Application Data

[63] Continuation of Ser. No. 549,151, Feb. 12, 1975, abandoned, which is a continuation-in-part of Ser. No. 350,093, Apr. 11, 1973, abandoned.

[30] Foreign Application Priority Data

Apr. 13, 1972 [DE] Fed. Rep. of Germany ....... 2217796

[51] Int. Cl.² .......................... B32B 3/02; B32B 7/02
[52] U.S. Cl. ................................. 428/192; 101/401.1; 101/415.1; 428/213; 428/215; 428/245; 428/909
[58] Field of Search ............... 101/415.1, 401.3, 401.1; 428/909, 213, 215, 245, 192

[56] References Cited

U.S. PATENT DOCUMENTS

| 1,231,142 | 6/1917 | Ellis | 101/415.1 |
|---|---|---|---|
| 2,076,376 | 4/1937 | Lewis et al. | 428/909 |
| 2,207,999 | 7/1940 | Foster | 428/909 |
| 2,629,324 | 2/1953 | Smith | 101/415.1 |
| 3,045,595 | 7/1962 | Gurin | 428/909 |
| 3,347,161 | 10/1967 | Lenk et al. | 101/401.3 |
| 3,418,864 | 12/1968 | Ross | 428/909 |
| 3,430,560 | 3/1969 | Nettleman | 428/909 |
| 3,802,952 | 4/1974 | Gurin et al. | 428/909 |

*Primary Examiner*—Clyde I. Coughenour
*Attorney, Agent, or Firm*—Diller, Ramik & Wight

[57] ABSTRACT

The invention relates to a composite printing blanket formed by a multi-ply printing blanket and at least one multi-ply supporting blanket each being immovably laminated to each other but being relatively slidable or shiftable at an interface therebetween whereby high quality printing is maintained and replacement costs are minimized due to the necessity of disgarding only the multi-ply printing blanket when replacement is dictated.

13 Claims, 5 Drawing Figures

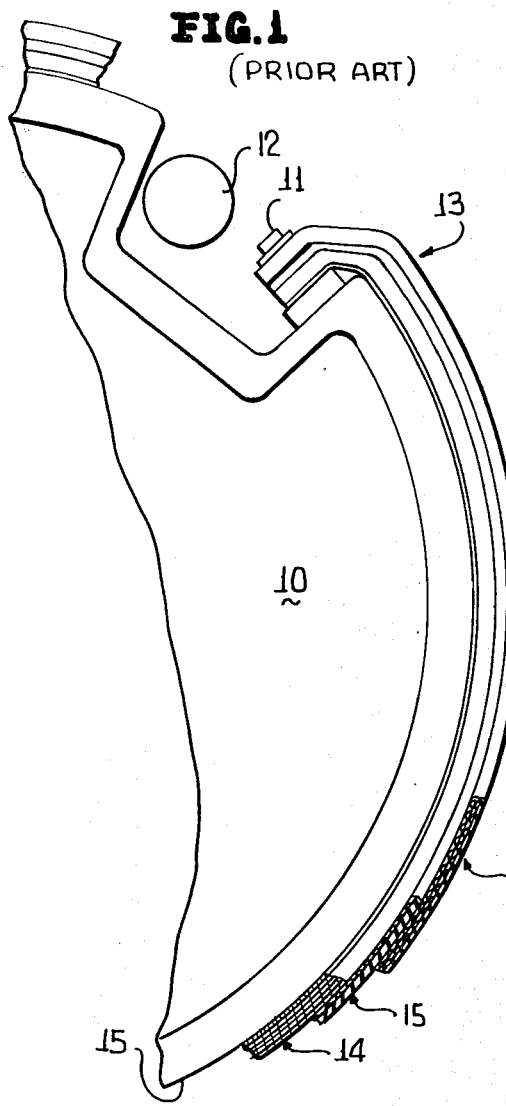
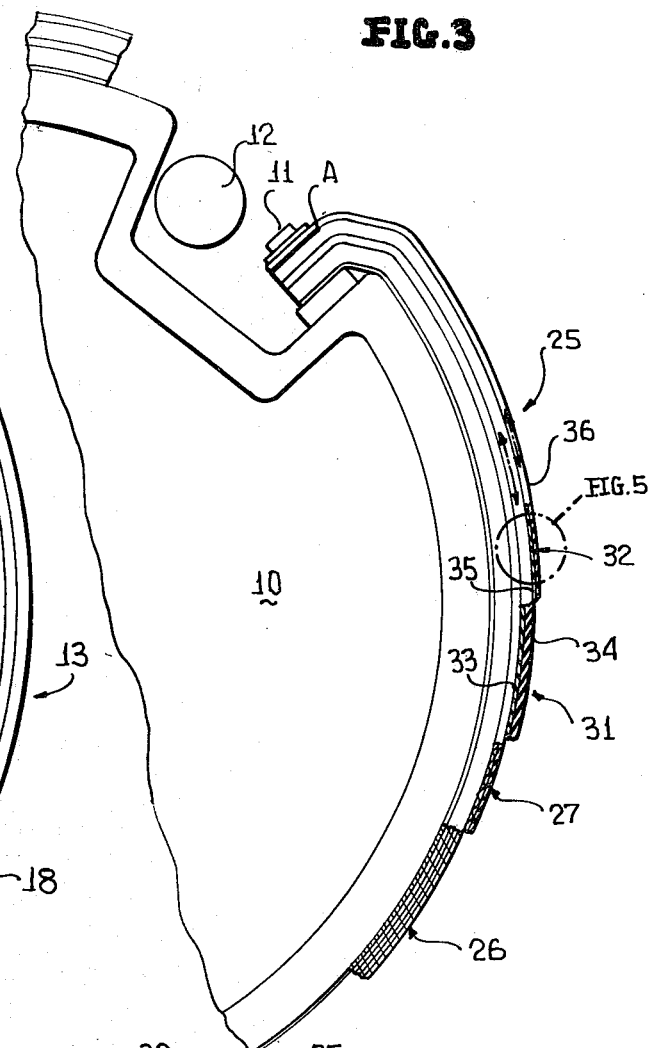
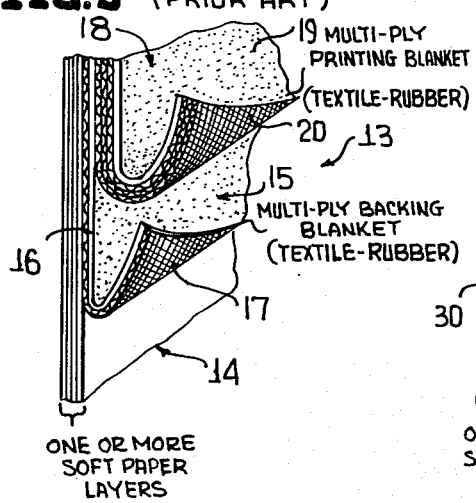
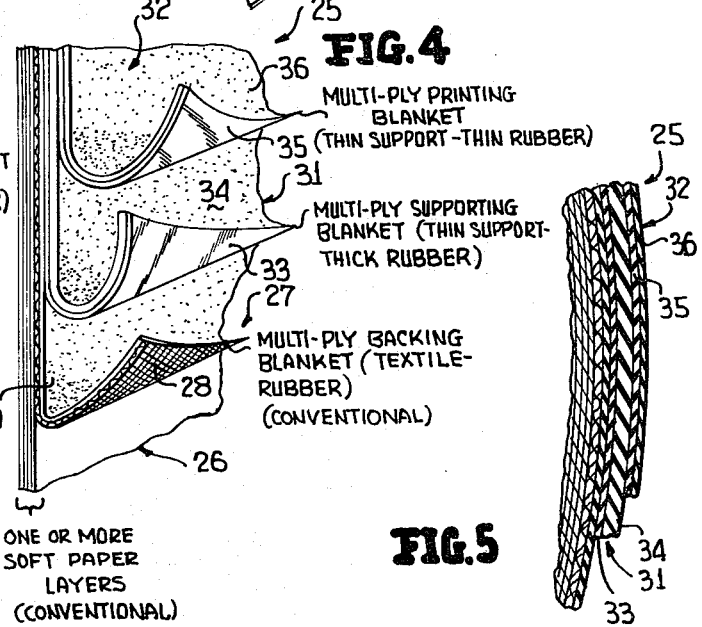
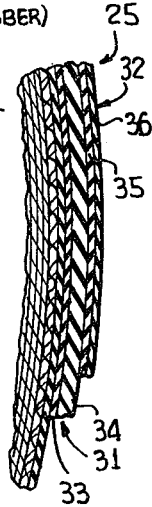

CYLINDER BLANKET FOR OFFSET PRINTING PRESSES

This is a continuation of application Ser. No. 549,151 filed Feb. 12, 1975, now abandoned, which is in turn a continuation-in-part of application Ser. No. 350,093, filed Apr. 11, 1973, now abandoned. The present invention relates to a composite cylinder blanket for offset printing presses comprising a multi-ply printing blanket and multi-ply supporting blanket, the multi-ply printing blanket includes an outermost sheet of rubber adapted to receive thereupon printing ink and an innermost sheet of relatively tear resistant non-stretchable material, an outermost sheet of the multi-ply supporting blanket is formed of relatively hard elastomeric or like material and is comparably quite thicker than the outermost sheet of the multi-ply printing blanket, and an innermost sheet of relatively thin material, and the respective sheets of each blanket are immovably laminated to each other but the multi-ply printing blanket and multi-ply supporting blanket are relatively slidable or capable of slipping relative to each other when clamped to an associated printing cylinder.

BACKGROUND OF THE INVENTION

During the passage of paper through an offset printing press the paper may develop "crumples" or "wrinkles" whereby an uneven spot results which must be absorbed by the cylinder blanket. As a rule a "crumple" or any other uneveness in the paper or between the printing rollers causes a lasting impression upon or in the cylinder blanket, particularly in the outermost or printing ply of a composite or multi-ply printing blanket as a result of which the printing quality is greatly reduced during further printing operations. In many cases there is no other recourse but to replace the entire cylinder printing blanket by a new one which results in relatively high replacement costs.

In accordance with the present invention it was found that the disadvantage latter two noted and others could be avoided by constructing instead of a conventional cylinder blanket a composite cylinder blanket formed of two blankets or bodies, namely, a multi-ply printing blanket which overlies a multi-ply supporting blanket with the plys being immovably adhered to one another but with the blankets being in their totality shiftable or slidable relative to one another when carried by a conventional printing cylinder.

An attempt at the latter may be found, for example, in German Pat. No. 1,279,041 and U.S. Pat. No. 3,045,595. However, in such conventional printing blankets which are constructed of several layers including textile layers, the conventional blankets were easily too strongly plastically deformed or did not resume their original shape sufficiently quickly so that they were crumpled again or recrumpled in the case of renewed pressure during a cylinder printing operation. Furthermore, in keeping with the conventional thought and opinion such conventional blankets generally include soft textured or surfaced cloth which resulted in the fact that the "crumple" impressions lasted longer in the backing or filling blanket which in turn resulted in deformation of the overlying printing blanket.

SUMMARY OF THE INVENTION

In keeping with the foregoing, the invention is based on the objective of creating a composite cylinder blanket which overcomes the mentioned disadvantages of conventional cylinder blankets and makes possible faultless and neat prints even when a so-called "crumple" has occurred.

The latter object is achieved by constructing a composite cylinder blanket such that a multi-ply printing blanket thereof has an outermost thin rubber coated sheet to which is immovably laminated a tear resistant non-stretchable sheet with the latter blanket being backed-up by a multi-ply supporting blanket whose outermost sheet is of relatively thick and hard elastic or similar material backed-up by a carrier sheet, and though the latter two sheets are immovably laminated relative to each other the printing blanket and supporting blanket are relatively shiftable or slidable when in use.

Printing blankets constructed without textile or bearing rubber layers with reinforcement have not been known heretofore. Thus the construction of the multi-ply printing blanket in the form of a thin tear resistant non-stretchable carrier sheet carrying a thin rubber coating or sheet for the better transfer of printing pressure and the printing ink or medium to paper or the like is new. Thus in the multi-ply printing blanket of the overall composite cylinder blanket the use of the carrier sheet of needed elasticity of minimal stretch makes possible the quick recovery and thus quick regretion of "crumple" imprints.

Advantageously at least one mutual edge of the multi-ply printing blanket and the multi-ply supporting blanket are bonded or otherwise connected to each other, although each of opposite edges which are to be secured to the printing press cylinder may be adhered for ease of assembly of the composite cylinder blanket to an associated cylinder. However, the relative securement of the blankets to each other must be such that sliding or slippage may be achieved therebetween when in use.

The adhesive or other bonding between the blankets may be achieved by heat sealing, adhesive strips or spots, etc. This permits the ease of shifting the printing and supporting blankets in composite assembled form as the composite cylinder blanket and additionally maintains alignment between the latter components to assure proper mounting upon an associated printing press cylinder.

If in operation damage should occur to the multi-ply printing blanket then only the latter need be replaced and the multi-ply supporting blanket may be retained. Since the price of the printing blanket amounts to approximately 25% of the price of the entire composite cylinder blanket the separation, due to the adhesive heretofore noted which is preferably releasable, is justified from the standpoint of elminating but the minor component (multi-ply printing blanket) from the overall composite cylinder blanket and the replacement of the disgarded component by another new multi-ply printing blanket. Further, this also achieves considerably shorter shut-downs of printing presses which automatically leads to considerable savings in time, money, effort and convenience.

The fact that the carrier sheet of the multi-ply printing blanket is formed of tear resistant relatively non-stretchable material, such as plastic foil formed of polyethelene-terephtalate carrying the outermost rubber printing sheet or coating as provided particularly favorable results. A carrier sheet so constructed has been proven extraordinarily suited to preclude the undesired printing heretofore repetitively created by conventional blankets, particularly those which injure the conventional blankets and prevent recovery, as in the case of the paper "crumples" heretofore described.

The extraordinary construction of the overall composite cylinder blanket is such that it has been found that the same can be damaged practically only by pointed objects and therefore otherwise has a very long and useful life. This is due on one hand to the multiple component construction of the composite cylinder blanket (multi-ply printing blanket carried by multi-ply supporting blanket), the slidable nature thereof relative to each other, and the relative thicknesses, hardnesses, and other physical characteristics of the materials involved.

With the above and other objects in view that will hereinafter appear, the nature of the invention wil be more clearly understood by reference to the following detailed description, the appended claims, and the several views illustrated in the accompanying drawing

IN THE DRAWING:

FIG. 1 is a diagrammatic end elevational view with parts broken away as shown in section, and illustrates a printing cylinder having mounted thereon a conventional printing blanket.

FIG. 2 is an enlarged fragmentary view of a portion of the conventional prior art printing blanket, and illustrates various layers thereof.

FIG. 3 is a view similar to 1, but illustrates the novel composite cylinder blanket of this invention attached to the printing cylinder.

FIG. 4 is an enlarged fragmentary perspective view of a portion of the novel composite cylinder blanket of FIG. 3, and illustrates the latter being formed as a multi-ply printing blanket carried by a multi-ply supporting blanket.

FIG. 5 is an enlarged fragmentary sectional view of the encircled portion of FIG. 3 indicated by the caption FIG. 5 and more specifically illustrates the relationships of the multi-ply blankets of the composite cylinder blanket, as well as underlying conventional backing blankets and paper layers.

Before describing the present invention reference is made to FIG. 1 of the drawing which illustrates a conventional printing cylinder 10 of a conventional offset printing press (not shown) which has mounted thereon by bolts 11 (only one of which is shown) along one edge and a conventional ratchet wheel 12 at an opposite edge a conventional multi-ply printing blanket 13. The printing cylinder 10 may be, for example, constructed in accordance with that disclosed in the patent to Emanuel Gurin entitled Printing Machine and Printing Blanket therefore issued July 24, 1962 under U.S. Pat. No. 3,045,595.

The mult-ply printing blanket 13 includes a plurality of sheets of paper or paper stock material which are collectively designated by the reference numeral 14. The sheets 14 lie most immediately adjacent a cylinder surface 15 of the printing cylinder 10, in the manner best illustrated in FIG. 1.

The radial outermost one of the plurality of sheets 14 is overlayed by a multi-ply backing blanket 15 composed of a layer or sheet 16 of thin rubber or similar elastomeric material to which is bonded a layer 17 of textile fabric.

The outermost component of the overall blanket is a printing blanket 18, also formed as a multi-ply construction, including an outermost layer or sheet 19 of rubber or similar elastomeric material and one or more layers 20 of textile material bonded thereto.

As compared to the conventional composite printing blanket 13 a novel composite printing blanket of the present invention is best shown in FIG. 4 and as shown is designated by reference numeral 25. Just as in the case of the composite printing blanket 13 the composite printing blanket 25 includes one or more sheets or layers of paper or paper stock material collectively indicated by the reference numeral 26 and a multi-ply backing blanket 27 having an innermost textile layer 28 bonded to a rubber or like elastomeric layer 30.

However, as distinguished from known composite printing blankets of conventional constructions, such as the blanket 13 of FIGS. 1 and 2, the composite multi-ply printing blanket 25 includes apart from or in addition to the plys 26, 27 to additional multi-ply blankets including a multi-ply supporting blanket 31 and a multi-ply printing blanket 32. The multi-ply supporting blanket 31 includes a thin relatively smooth layer or sheet 33 of tissue or foil being adhesively and immovably bonded to a thicker layer 34 of hard elastic raw material, such as polyester, or a hard rubber mixture, or steel foil. The overall thickness of the multi-ply supporting blanket 31 is about 1.4–2.8 mm.

The multi-ply printing blanket 32 includes a thin innermost ply or layer 35 formed of tear resistant relatively non-stretchable plastic foil, preferably polyethelene-terephtalate having immovably bonded thereto a ply or layer 36 of rubber or like elastomeric material. The overall thickness of the multi-ply printing blanket 32 is about 0.1 – 0.3 mm and the layer 35 readily slides or slips relative to the layer 34 of the supporting blanket 31 when mounted upon the printing cylinder 10 in the manner illustrated in FIG. 3. However, for ease of assembling the blankets 31, 32 upon the cylinder 10 the latter blankets are adhesively united to each other at least along one marginal edge by a band or layer of adhesive A (FIG. 3) which may be a continuous stripe or a plurality of adhesive spots running the length of one marginal edge of the blankets 31, 32 between the surfaces 34 and 35 thereof. The adhesive A also maintains the blankets 31, 32 in alignment during mounting operations. If desired, a like strip of adhesive, a heat sealed bond, or the like may be applied between the sheets 34, 35 at the opposite (not shown) end of the blankets 31, 32. Thus, except for the single application of adhesive A along one margin or the application of adhesive along both margins, the blankets 31, 32 are relatively shiftable or slidable relative to each other along the interface between the opposing surfaces of the plys or layers 34, 35.

Due to the thicknessess heretofore mentioned it is also pointed out that the same results in a savings and cost of approximately 60% as compared to conventional printing blankets used heretofore.

It must be pointed out that the overall thickness of the multi-ply supporting blanket 31 plus the multi-ply printing blanket 32 is equal to the prior art printing blanket 18. The preferred ratio of the thickness of both blankets 31 and 32 is 10:1 or more.

It is further pointed out that with the structure according to the invention only the thin multi-ply printing blanket 32 is gripped and tightened on the ratchet wheel 12, while the multi-ply supporting blanket ends before the ratchet wheel 12 and is kept on the plys 26, 27 only by the radial pressure exerted by the multi-ply printing blanket. (FIG. 3) In the prior art structure the thick printing blanket 18 is fastened on the ratchet wheel 12.

While preferred forms and arrangements of parts have been shown in illustrating the invention, it is to be clearly understood that various changes in detail and arrangement of parts may be made without departing from the spirit and scope of this disclosure.

It is claimed:

1. A composite printing blanket comprising at least a multi-ply printing blanket and a multi-ply supporting blanket, said multi-ply printing blanket being in overlying relationship to said multi-ply supporting blanket and being the outermost element relative to a printing cylinder to which said composite printing blanket is adapted to be attached, said multi-ply printing blanket and multi-ply supporting blanket each being constructed as a laminate of at least two individually, separately preformed sheets, an outermost sheet of said multi-ply printing blanket laminate being constructed of thin elastomeric material and being adapted to receive thereupon a fluid printing medium, an innermost sheet of said multi-ply printing blanket laminate being constructed of tear resistant relatively non-stretchable material, said two last-mentioned preformed sheets being immovably laminated relative to each other, an outermost sheet of said multi-ply supporting blanket laminate being disposed immediately adjacent to and against said innermost sheet of said multi-ply printing blanket laminate and being constructed of thick elastomeric material, an innermost sheet of said multi-ply supporting blanket laminate being constructed of tear resistant relatively non-stretchable material, said innermost and outermost preformed sheets of said multi-ply supporting blanket laminate being immovably laminated relative to each other, said outermost elastomeric sheet of said multi-ply printing blanket being thin as compared to said thick elastomeric outermost sheet of said multi-ply supporting blanket, said multi-ply supporting blanket being at least about five times as thick as said multi-ply printing blanket, said multi-ply printing blanket and multi-ply supporting blanket being in shifting relationship to each other whereby a foreign body impressed against said thin elastomeric outermost sheet of said multi-ply printing blanket laminate by the force of an associated printing cylinder creates limited localized deformation of said thin elastomeric outermost sheet which rapidly returns to a none-deformed state by virtue of the non-stretchable innermost sheet of said multi-ply printing blanket laminate, the thicker elastomeric outermost sheet of said multi-ply supporting blanket, and said shifting relationship between said multi-ply printing blanket and said multi-ply supporting blanket.

2. The composite printing blanket as defined in claim 1 wherein said multi-ply printing blanket innermost sheet is adhered to said multi-ply supporting blanket outermost sheet by means to maintain said last-mentioned sheets adhered to each other without precluding said shifting relationship between said multi-ply printing blanket and said multi-ply supporting blanket.

3. The composite printing blanket as defined in claim 2 wherein said adhering means is a releasable bond disposed along only a minor portion of said last-mentioned sheets.

4. The composite printing blanket as defined in claim 2 wherein siad adhering means is a releasable bond disposed along only an edge mutual to said last-mentioned sheets.

5. The composite printing blanket as defined in claim 2 wherein said adhereing means is a releasable bond disposed between opposing faces of said last-mentioned sheets and along a mutual edge thereof.

6. The composite printing blanket as defined in claim 1 including in combination a conventional multi-ply backing blanket disposed immediately adjacent to and against said innermost sheet of said multi-ply supporting blanket laminate.

7. The composite printing blanket as defined in claim 6 wherein said conventional multi-ply backing blanket is a laminate of at least two sheets including an outermost laminate of elastomeric material disposed adjacent to and against said innermost sheet of said multi-ply supporting blanket laminate.

8. The composite printing blanket as defined in claim 7 including a plurality of individual separate sheets disposed adjacent an innermost laminate of said conventional multi-ply backing blanket.

9. The composite printing blanket as defined in claim 8 wherein said separate sheets are formed of fibrous material, and said last-mentioned laminate is formed of textile material.

10. The composite printing blanket as defined in claim 1 wherein said multi-ply supporting blanket is no more than about twenty-eight times as thick as said multi-ply printing blanket.

11. The composite printing blanket as defined in claim 1 wherein the thickness of said multi-ply printing blanket ranges approximately between 0.0–0.3 mm.

12. The composite printing blanket as defined in claim 1 wherein the thickness of said multi-ply supporting blanket ranges approximately between 1.4–2.8 mm.

13. The composite printing blanket as defined in claim 11 wherein the thickness of said multi-ply supporting blanket ranges approximately between 1.4–2.8 mm.

* * * * *